(12) United States Patent
Park

(10) Patent No.: US 12,070,104 B2
(45) Date of Patent: Aug. 27, 2024

(54) NEGATIVE POISSON'S RATIO MATERIALS FOR FASTENERS

(71) Applicant: Joon Bu Park, Las Vegas, NV (US)

(72) Inventor: Joon Bu Park, Las Vegas, NV (US)

( * ) Notice: Subject to any disclaimer, the term of this patent is extended or adjusted under 35 U.S.C. 154(b) by 0 days.

(21) Appl. No.: 18/453,377

(22) Filed: Aug. 22, 2023

(65) Prior Publication Data

US 2023/0389659 A1    Dec. 7, 2023

Related U.S. Application Data

(62) Division of application No. 17/553,151, filed on Dec. 16, 2021, now Pat. No. 11,771,183.

(51) Int. Cl.
| | | |
|---|---|---|
| *B33Y 80/00* | (2015.01) | |
| *A44B 19/24* | (2006.01) | |
| *B65D 41/04* | (2006.01) | |
| *F16B 19/04* | (2006.01) | |

(52) U.S. Cl.
CPC .......... *A44B 19/24* (2013.01); *B65D 41/0407* (2013.01); *F16B 19/04* (2013.01); *B33Y 80/00* (2014.12)

(58) Field of Classification Search
CPC ................ A44B 19/24; B65D 41/0407; B65D 39/0005; B65D 41/04; F16B 19/04; B33Y 80/00
See application file for complete search history.

(56) References Cited

U.S. PATENT DOCUMENTS

| | | |
|---|---|---|
| 4,668,557 A | 5/1987 | Lakes |
| 7,837,147 B2 | 11/2010 | Liguore et al. |
| 7,989,057 B2 | 8/2011 | Alderson et al. |
| 8,042,768 B2 | 10/2011 | Liguore et al. |
| 8,277,719 B2 | 10/2012 | Alderson et al. |
| 8,297,555 B2 | 10/2012 | Liguore et al. |
| 8,528,862 B2 | 9/2013 | Liguore et al. |
| 8,652,602 B1 | 2/2014 | Dolla |
| 9,580,907 B2 | 2/2017 | Gandhi |
| 9,709,274 B2 | 7/2017 | Innes |
| 9,949,518 B2 | 4/2018 | Toronjo |
| 10,028,817 B2 | 7/2018 | Jagger et al. |
| 10,066,508 B2 | 9/2018 | Geiger |
| 10,266,310 B2 | 4/2019 | Li et al. |

(Continued)

FOREIGN PATENT DOCUMENTS

| | | |
|---|---|---|
| AU | 2019468312 | 5/2021 |
| CN | 2153593 | 1/1994 |

(Continued)

OTHER PUBLICATIONS

International Search Report and Written Opinion in International Appln No. PCT/US2022/05297 4, mailed on Apr. 26, 2023, 32 pages.

*Primary Examiner* — David M Upchurch

(74) *Attorney, Agent, or Firm* — Fish & Richardson P.C.

(57) ABSTRACT

The disclosure describes a zipper including two rows of zipper teeth, in which at least some of the zipper teeth include a negative Poisson's ratio (NPR) foam material having a Poisson's ratio of between 0 and −1, and a slider movably attached to one of the rows of the zipper teeth and configured to connect the two rows of zipper teeth when the slider is moved in a first direction and to disconnect the two rows of zipper teeth when the slider is moved in an opposite direction.

14 Claims, 10 Drawing Sheets

(bottle cap)

(56) References Cited

U.S. PATENT DOCUMENTS

| | | | |
|---|---|---|---|
| 10,427,397 B2 | 10/2019 | Ng et al. | |
| 10,434,977 B2 | 10/2019 | Chuang et al. | |
| 10,611,478 B2 | 4/2020 | Bullock et al. | |
| 10,723,526 B1* | 7/2020 | Aboabdo | B65D 43/0231 |
| 10,799,350 B2 | 10/2020 | Passman et al. | |
| 10,830,102 B2 | 11/2020 | Martin et al. | |
| 11,117,344 B2 | 9/2021 | Martino-Gonzalez et al. | |
| 11,131,243 B2 | 9/2021 | Martino-Gonzalez et al. | |
| 11,142,343 B2 | 10/2021 | Hubert-Choinard et al. | |
| 11,771,183 B2 | 10/2023 | Park | |
| 2007/0275622 A1* | 11/2007 | Masuda | D04H 13/00 442/327 |
| 2008/0248710 A1 | 10/2008 | Wittner | |
| 2011/0029063 A1 | 2/2011 | Ma et al. | |
| 2011/0064909 A1 | 3/2011 | Alderston et al. | |
| 2011/0281481 A1 | 11/2011 | Alderson et al. | |
| 2013/0172509 A1 | 7/2013 | Pawloski et al. | |
| 2015/0289606 A1* | 10/2015 | Coakley | A44B 19/24 223/111 |
| 2016/0219979 A1 | 8/2016 | Wright | |
| 2017/0035147 A1 | 2/2017 | Farris et al. | |
| 2017/0370581 A1 | 12/2017 | Bertoldi et al. | |
| 2018/0264775 A1 | 9/2018 | Bertoldi et al. | |
| 2018/0272649 A1 | 9/2018 | Bertoldi et al. | |
| 2018/0312239 A1 | 11/2018 | Velez De Mendizabal Alonso et al. | |
| 2019/0328071 A1 | 10/2019 | Stone et al. | |
| 2020/0062423 A1 | 2/2020 | Hubert-Choinard et al. | |
| 2021/0062311 A1 | 3/2021 | He et al. | |
| 2021/0095700 A1 | 4/2021 | Sedal et al. | |
| 2021/0115664 A1 | 4/2021 | McGee et al. | |
| 2021/0189536 A1 | 6/2021 | He et al. | |
| 2022/0031028 A1* | 2/2022 | Martinson | B65D 33/2508 |
| 2022/0220989 A1* | 7/2022 | Cosgrove | H05K 7/14 |
| 2023/0189940 A1 | 6/2023 | Park | |

FOREIGN PATENT DOCUMENTS

| | | |
|---|---|---|
| CN | 2165178 | 5/1994 |
| CN | 1095444 | 11/1994 |
| CN | 2240631 | 11/1996 |
| CN | 2399547 | 10/2000 |
| CN | 2777265 | 5/2006 |
| CN | 101352795 | 1/2009 |
| CN | 201195831 | 2/2009 |
| CN | 201694268 | 1/2011 |
| CN | 203906477 | 10/2014 |
| CN | 204164076 | 2/2015 |
| CN | 104594928 | 5/2015 |
| CN | 104769292 | 7/2015 |
| CN | 204505172 | 7/2015 |
| CN | 105001622 | 10/2015 |
| CN | 105041355 | 11/2015 |
| CN | 105545850 | 5/2016 |
| CN | 105926643 | 9/2016 |
| CN | 106236338 | 12/2016 |
| CN | 106594030 | 4/2017 |
| CN | 206289817 | 6/2017 |
| CN | 106934175 | 7/2017 |
| CN | 206530847 | 9/2017 |
| CN | 107326454 | 11/2017 |
| CN | 108346567 | 7/2018 |
| CN | 108372442 | 8/2018 |
| CN | 207828902 | 9/2018 |
| CN | 108754305 | 11/2018 |
| CN | 108754339 | 11/2018 |
| CN | 208149239 | 11/2018 |
| CN | 208381071 | 1/2019 |
| CN | 208473911 | 2/2019 |
| CN | 109802068 | 5/2019 |
| CN | 109805984 | 5/2019 |
| CN | 109959556 | 7/2019 |
| CN | 110110425 | 8/2019 |
| CN | 110236260 | 9/2019 |
| CN | 110518160 | 11/2019 |
| CN | 110529480 | 12/2019 |
| CN | 110581297 | 12/2019 |
| CN | 209774923 | 12/2019 |
| CN | 110836651 | 2/2020 |
| CN | 110863851 | 3/2020 |
| CN | 210152696 | 3/2020 |
| CN | 210158087 | 3/2020 |
| CN | 210427219 | 4/2020 |
| CN | 210534963 | 5/2020 |
| CN | 111284679 | 6/2020 |
| CN | 210660921 | 6/2020 |
| CN | 210858767 | 6/2020 |
| CN | 211081929 | 7/2020 |
| CN | 111623022 | 9/2020 |
| CN | 111648806 | 9/2020 |
| CN | 111707402 | 9/2020 |
| CN | 111894643 | 11/2020 |
| CN | 112092979 | 12/2020 |
| CN | 112096431 | 12/2020 |
| CN | 112141268 | 12/2020 |
| CN | 212190990 | 12/2020 |
| CN | 112228131 | 1/2021 |
| CN | 112228132 | 1/2021 |
| CN | 112267479 | 1/2021 |
| CN | 212614807 | 2/2021 |
| CN | 212837890 | 3/2021 |
| CN | 112610796 | 4/2021 |
| CN | 212960347 | 4/2021 |
| CN | 112814714 | 5/2021 |
| CN | 112816347 | 5/2021 |
| CN | 112816348 | 5/2021 |
| CN | 213175682 | 5/2021 |
| CN | 213242689 | 5/2021 |
| CN | 112983470 | 8/2021 |
| CN | 111946376 | 9/2021 |
| CN | 113356880 | 9/2021 |
| DE | 202006002470 | 4/2006 |
| EP | 1878873 | 8/2016 |
| EP | 3501973 | 6/2019 |
| GB | 2489457 | 10/2012 |
| GE | 201005284 | 5/2010 |
| IN | 9287DELNP2008 | 3/2009 |
| JP | 2020-125836 | 8/2020 |
| JP | 2020-126962 | 8/2020 |
| WO | WO 2018/116100 | 6/2018 |
| WO | WO 2019/081766 | 5/2019 |
| WO | WO 2019/141794 | 7/2019 |
| WO | WO 2021/040716 | 3/2021 |
| WO | WO 2021/127445 | 6/2021 |
| WO | WO 2021/138639 | 7/2021 |

* cited by examiner (bottle cap)

NEGATIVE POISSON'S RATIO MATERIALS FOR FASTENERS

CROSS-REFERENCE TO RELATED APPLICATIONS

This application is a divisional application of and claims the benefit of priority under 35 U.S.C. § 121 to U.S. application Ser. No. 17/553,151, filed on Dec. 16, 2021, the contents of which are hereby incorporated by reference.

BACKGROUND

Various types of fasteners and closure devices exist, such as zippers, rivets, bottle caps, and corks.

SUMMARY

The present disclosure relates generally to materials for and construction of various types of fasteners and closure devices, including zippers, bottle caps, corks, and rivets.

We describe here fasteners, such as zippers, bottle caps, corks, rivets, etc., that are formed of materials having a negative Poisson's ratio ("NPR materials"). For instance, the teeth of a zipper can be formed of an NPR material. The use of an NPR material in these fasteners provides structure that enables the fasteners to be used to efficiently and tightly fasten objects together. In some examples, fasteners are formed of composite materials that include both NPR materials and materials with positive Poisson's ratios ("PPR materials") to achieve desired performance characteristics.

In an aspect, a zipper includes two rows of zipper teeth, in which at least some of the zipper teeth comprise a negative Poisson's ratio (NPR) foam material having a Poisson's ratio of between 0 and −1; and a slider movably attached to one of the rows of the zipper teeth and configured to connect the two rows of zipper teeth when the slider is moved in a first direction and to disconnect the two rows of zipper teeth when the slider is moved in an opposite direction.

Embodiments can include one or any combination of two or more of the following features.

The NPR foam material comprises an NPR metal foam, e.g., one or more of iron, titanium, or aluminum.

The NPR foam material comprises a polymer NPR foam.

The NPR foam material has a Poisson's ratio of between 0 and −0.8.

The NPR foam material is composed of a cellular structure having a characteristic dimension of between 0.1 µm and 3 mm.

At least some of the zipper teeth tooth comprise a composite material comprising the NPR foam material and a positive Poisson's ratio (PPR) material.

In an aspect, a method of making a zipper includes forming multiple rows of zipper teeth, including forming at least some of the teeth from a negative Poisson's ratio (NPR) foam material having a Poisson's ratio of between 0 and −1; and attaching a slider to a row of the zipper teeth such that the slider can move along the row.

Embodiments can include one or any combination of two or more of the following features.

Forming the zipper teeth from an NPR foam material comprises heating and compressing a positive Poisson's ratio (PPR) foam material to form the NPR foam material.

Forming the zipper teeth from an NPR foam material comprises forming the zipper teeth from nano- or micro-structured PPR materials.

Forming the zipper teeth from an NPR foam material comprises forming the zipper teeth using an additive manufacturing technique.

In an aspect, a bottle cap comprises a base; and walls connected to the base to define an interior of the bottle cap, wherein the base, the walls, or both are formed of a negative Poisson's ratio (NPR) foam material that has a Poisson's ratio of between 0 and −1.

Embodiments can include one or any combination of two or more of the following features.

The NPR material comprises microspheres.

The bottle cap has a Poisson's ratio of between 0 and −0.8.

The NPR material is composed of a cellular structure having a characteristic dimension of between 0.1 µm and 3 mm.

An interior surface of the walls comprises threaded features.

The NPR foam material comprises an NPR ceramic foam, an NPR metal foam, an NPR polymer foam, or an NPR-PPR composite foam.

In an aspect, a method of making a bottle cap includes forming a material into an negative Poisson's ratio (NPR) material, in which the NPR material has a Poisson's ratio of between 0 and −1; and creating at least a portion of a bottle cap out of the NPR material; wherein the bottle cap comprises a base and walls connected to the base to define an interior.

Embodiments can include one or any combination of two or more of the following features.

Forming the material into an NPR material comprises forming microspheres of the material.

In an aspect, a rivet comprises a smooth cylindrical shaft, the shaft configured to expand in diameter when deformed; wherein the shaft comprises a negative Poisson's ratio (NPR) material, in which the NPR material has a Poisson's ratio of between 0 and −1, and in which the NPR material comprises an NPR foam.

Embodiments can include one or any combination of two or more of the following features.

The NPR foam material comprises an NPR metal foam, e.g., one or more of iron, titanium, or aluminum.

The NPR material has a Poisson's ratio of between 0 and −0.8.

The NPR material is composed of a cellular structure having a characteristic dimension of between 0.1 µm and 3 mm.

The shaft comprises a composite material comprising the NPR material and a positive Poisson's ratio (PPR) material.

Other implementations are within the scope of the claims.

DETAILED DESCRIPTION

We describe here fasteners, such as zippers, bottle caps, corks, rivets, etc., that are formed of materials having a negative Poisson's ratio ("NPR materials"). For instance, the teeth of a zipper can be formed of an NPR material. The use of an NPR material in these fasteners provides structure that enables the fasteners to be used efficiently and tightly fasten objects together. In some examples, fasteners are formed of composite materials that include both NPR materials and materials with positive Poisson's ratios ("PPR materials") to achieve desired performance characteristics.

Figure 1:
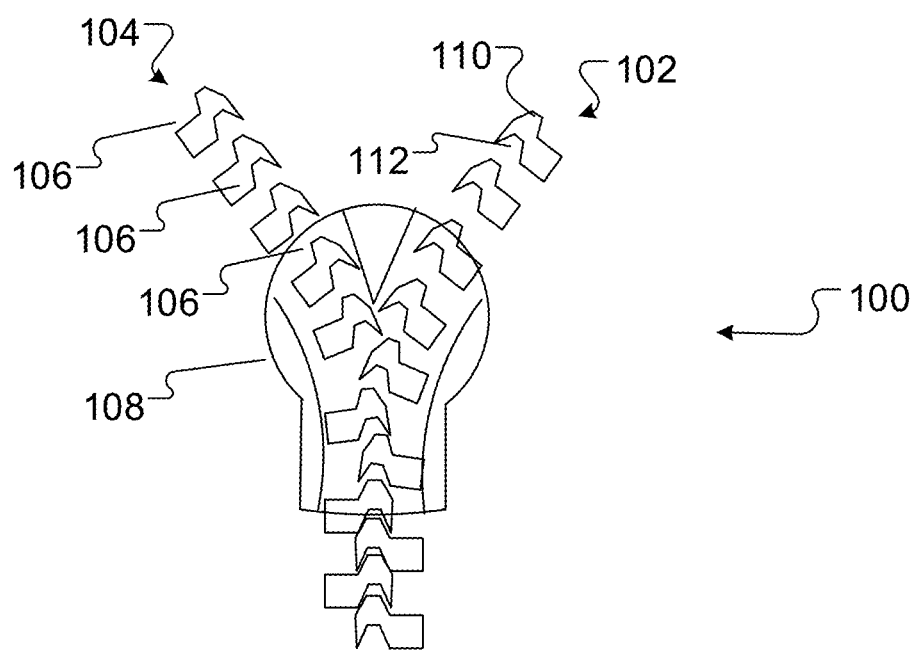
FIG. 1 is an illustration of a zipper.

FIG. 1 illustrates a zipper 100 that includes an NPR material. The zipper 100 includes two rows 102, 104 of zipper teeth 106. A slider 108 is movably attached to one row 102 of the zipper 100. When the slider 108 is moved along the row 102, it fastens one row 102 of the zipper teeth to the second row 104 of zipper teeth. In one embodiment, each zipper tooth 106 of the zipper 100 includes a protrusion 110 and a recess 112 that can fit the protrusion 110 of an adjacent zipper tooth 106. As the slider 108 is moved along the zipper 100 in a first direction, the zipper teeth 106 are aligned, and the protrusion 110 of each zipper tooth 106 is fit into the recess 112 of the next zipper tooth 106. The zipper 100 is therefore fastened together by the protrusions 110 and the recesses 112. As the slider 108 is moved along the zipper 100 in the opposite direction, it disconnects the protrusions 110 and the recesses 112, unfastening the zipper 100.

One or more parts of the zipper 100, such as the zipper teeth 106, a portion of each zipper tooth 106 (e.g., the protrusions 110 of the zipper teeth), or the slider 108 include a material with a negative Poisson's ratio (referred to as an "NPR material" or an "auxetic material"), such as an NPR foam material, e.g., an NPR polymer foam, an NPR metal foam, or an NPR ceramic foam; or a solid NPR material. For instance, the teeth, the slider, or both can be formed of an NPR material or an NPR-PPR composite material. In some examples, the teeth 106, slider 108, or both can have portions formed of NPR material and portions formed of PPR material. In an example, the protrusions 110 of the zipper teeth 106 can be formed of an NPR material, while the rest of each tooth 106 can be formed of a PPR material, e.g., graphite, plastic, fiberglass, metal, or another suitable PPR material. In an example, the protrusions 110 can be formed of an NPR-PPR composite material and the rest of each tooth 196 can be formed of a PPR material. In some examples, fewer than all of the teeth 106 of the zipper 100 include an NPR material. For instance, the teeth 106 at one or both ends of the zipper 100 can include an NPR material to facilitate initiation of the zipper action, while teeth 106 toward the middle of the zipper can include PPR material.

When multiple zipper components are formed of an NPR material, the same material is not necessarily used for all components. For instance, the teeth 106 can include a first type of NPR material, and the slider 108 can include a second type of NPR material; or some teeth 106 include one type of NPR material and other teeth 106 include a different type of NPR material.

The NPR material used for the zipper 100 can be an NPR foam material or a solid NPR material. The NPR foam material can be an NPR metal foam, such as a foam of iron, titanium, aluminum, or other metals, or alloys thereof (e.g., steel). For example, all materials made for commercial use are specified in ASTM (American Standards for Testing and Materials) standards, such as 316L stainless steel. The NPR foam material used for the zipper 100 can be an NPR polymer foam, such as an NPR thermoplastic polymer foam (e.g., polyester polyurethane or polyether polyurethane) or an NPR viscoelastic elastomer foam. In some examples, components of the zipper 100 are formed of an NPR composite material that includes both an NPR material (e.g., an NPR foam material) and a PPR material. NPR-PPR composite materials are discussed further below. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

In some examples, a core of each of one or more zipper teeth is formed of an NPR material or an NPR-PPR composite material, and a PPR material coats the core such that the NPR material of the core is not exposed to the environment. This configuration can provide some of the benefits of an NPR material while also achieving benefits, such as durability, water resistance, or hardness, provided by the PPR material coating. In some examples, core of the zipper teeth is a PPR material and the coating is an NPR material or an NPR-PPR composite material.

The presence of NPR material in the zipper 100 can contribute to target performance characteristics, such as strength, durability, and fastening ability. For example, the zipper may be less likely to become unfastened due to the presence of NPR materials in the zipper. For example, the zipper can continue to interlock securely even as it ages.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a positive Poisson's ratio (a "PPR material") has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 2:
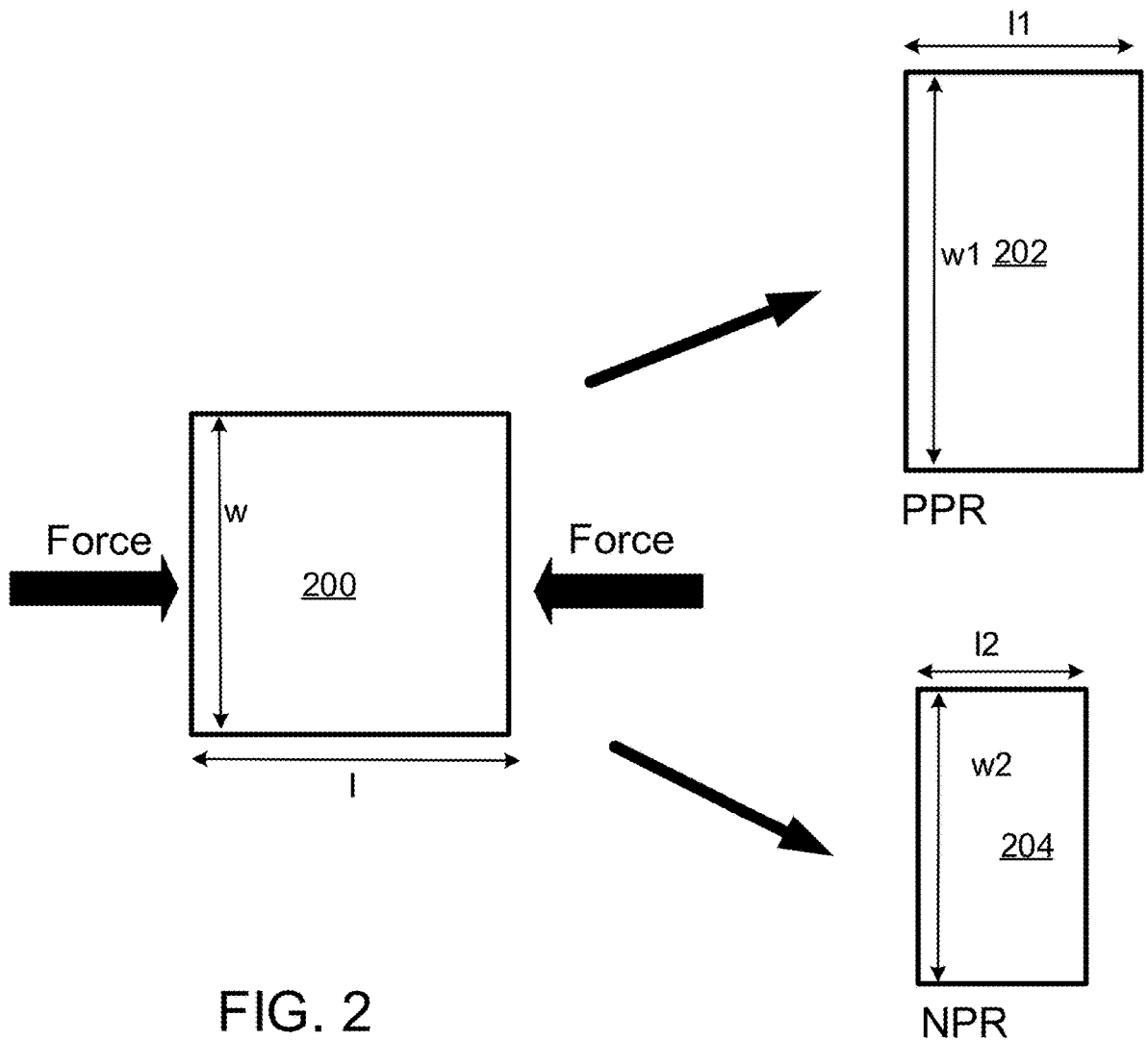
FIG. 2 is an illustration of materials with negative and positive Poisson's ratios.

Materials with negative and positive Poisson's ratios are illustrated in FIG. 2, which depicts a hypothetical two-dimensional block of material 200 with length l and width w.

If the hypothetical block of material 200 is a PPR material, when the block of material 200 is compressed along its width w, the material deforms into the shape shown as block 202. The width w1 of block 202 is less than the width w of block 200, and the length l1 of block 202 is greater than the length l of block 200: the material compresses along its width and expands along its length.

By contrast, if the hypothetical block of material 200 is an NPR material, when the block of material 200 is compressed along its width w, the material deforms into the shape shown as block 204. Both the width w2 and the length l2 of block 204 are less than the width w and length l, respectively, of block 200: the material compresses along both its width and its length.

NPR materials for zippers can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four inwardly directed walls of the cell to unfold, causing the material in cross-section to expand, such that expansion occurs in all directions. NPR foams can have a Poisson's ratio of between −1 and 0, e.g., between −0.8 and 0, e.g., −0.8, −0.7, −0.6, −−0.4, −0.3, −0.2, or −0.1. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about µm, about 50 µm, about 100 µm, about 500 µm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that a zipper that includes an NPR material (an "NPR zipper") undergoes a different (e.g., smaller) change in dimension when zipping than a comparable zipper formed of only PPR material (a "PPR zipper").

The compressibility of a zipper tooth affects the elastic deformation (e.g., compression) experienced by the zipper tooth when it is fit into a corresponding recess. A suitable amount of deformation enables an efficient fastening ability between the zipper teeth. A highly deformable zipper tooth will have a large amount deformation when in the recess of another zipper tooth, and will be inefficient at holding the zipper teeth together. To design a zipper that is capable of efficiently fastening two materials, the material of the zipper teeth can be selected to balance rigidity and elasticity. NPR materials can be incorporated into zipper teeth to provide the teeth with a desired deformability (e.g., rigidity) and strength.

Figure 3:
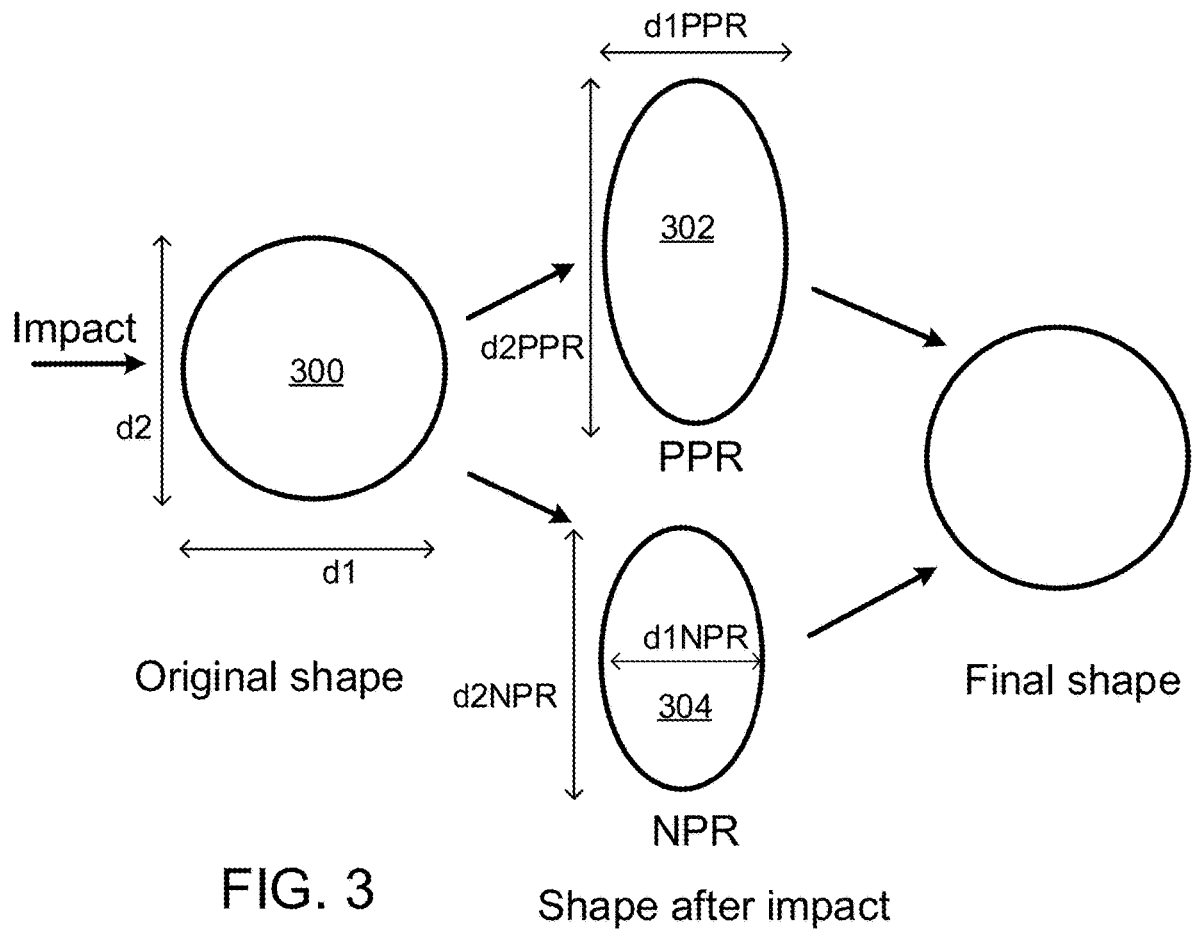
FIG. 3 is an illustration of balls with negative and positive Poisson's ratios.

FIG. 3 shows a schematic depiction of the change in diameter of a material 300 upon impact. Although the material 300 in FIG. 3 is shown as a rounded ball, a similar deformation occurs in materials of other shapes. Prior to impact, the material 300 has a diameter d1 in the direction of the impact and a diameter d2 in the direction perpendicular to the impact. If the material 300 is a PPR material, the material undergoes significant deformation (e.g., elastic deformation) into a shape 302, such that the diameter in the direction of the impact decreases to d1PPR and the diameter in the direction perpendicular to the impact increases to d2PPR. By contrast, if the material 300 is an NPR material, the material undergoes less extensive deformation into a shape 304. The diameter of the shape 304 in the direction of the impact decreases to d1NPR, which is approximately the same as d1PPR. However, the diameter of the shape 304 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 4A:
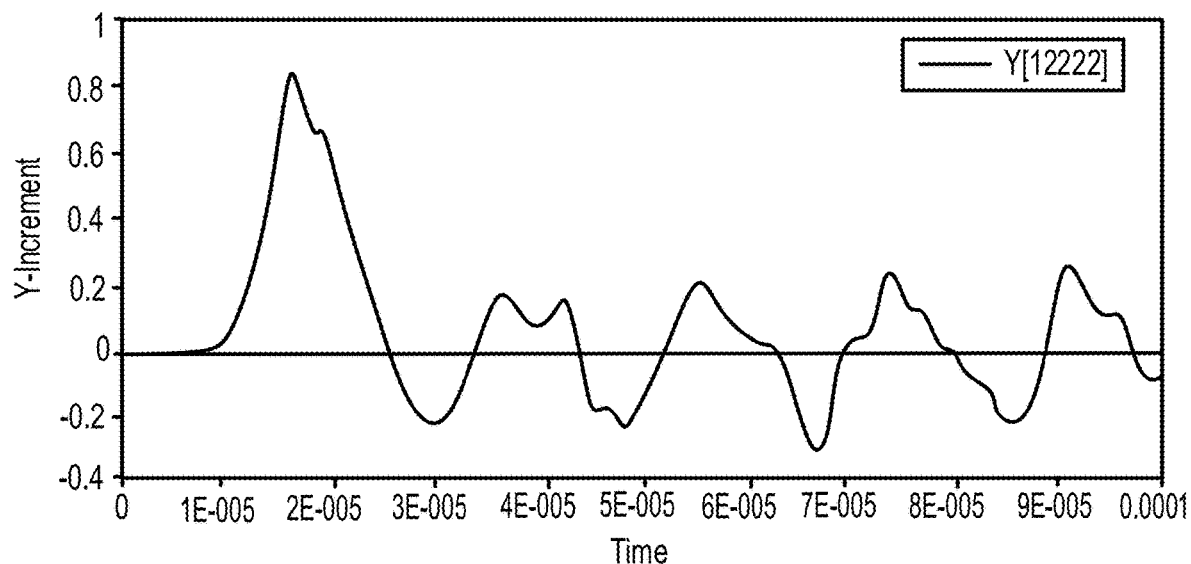
FIGS. 4A and 4B are plots of diameter versus time.
Figure 4B:
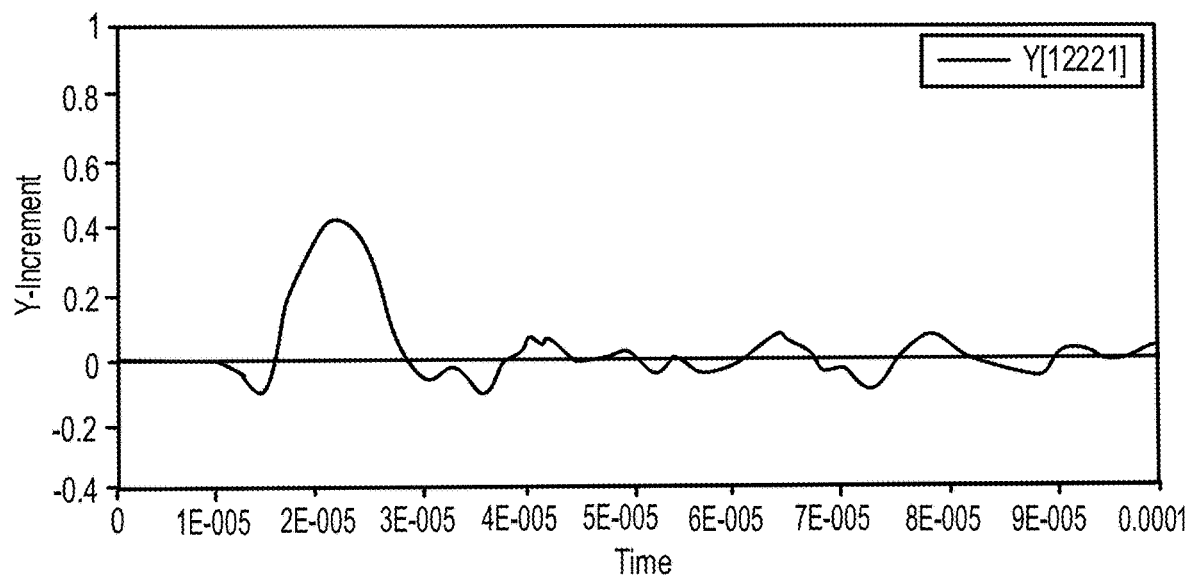

FIGS. 4A and 4B show plots of diameter versus time for a substantially spherical PPR material with a Poisson's ratio of 0.45 and an NPR material with a Poisson's ratio of –0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 4A and 4B are specific to substantially spherical materials, a similar behavior occurs in NPR and PPR materials of other shapes.

Figure 5:
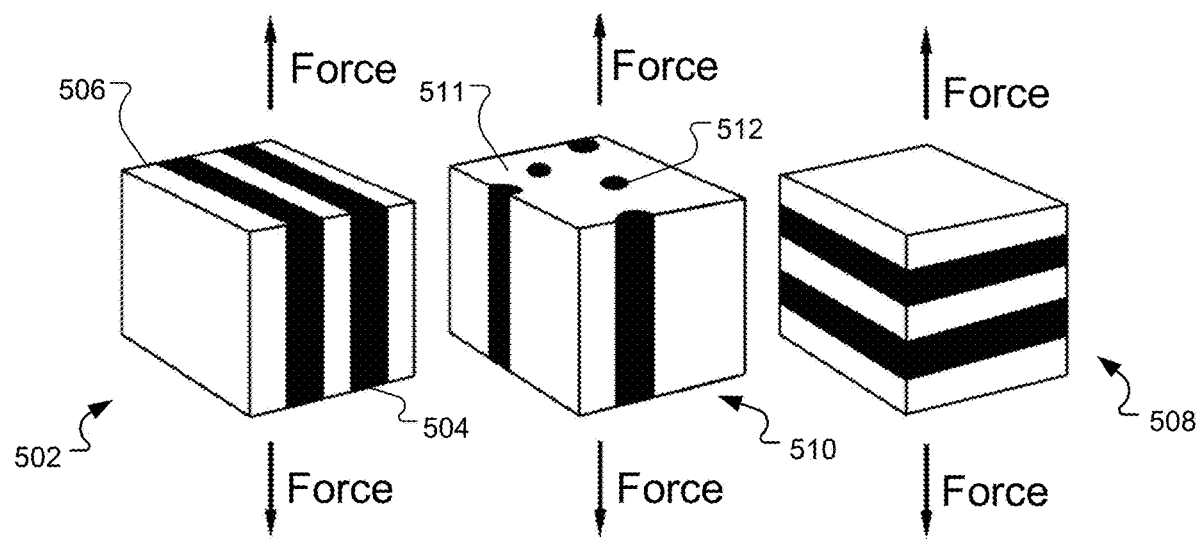
FIG. 5 is an illustration of composite materials.

FIG. 5 illustrates examples of NPR-PPR composite materials. An NPR-PPR composite material 502 is a laminar composite including alternating layers 504 of NPR material and layers 506 of PPR material. The layers 504, 506 are arranged in parallel to a force to be exerted on the composite material 502. Although the layers 504, 506 are shown as having equal width, in some examples, a laminar composite can have layers of different widths.

An NPR-PPR composite material 508 is a laminar composite including alternating layers of NPR material and PPR material, with the layers arranged perpendicular to a force to be exerted on the material 508. In some examples, the layers of a laminar composite are arranged at an angle to the expected force that is neither perpendicular nor parallel.

An NPR-PPR composite material 512 is a matrix composite including a matrix phase 511 of NPR material with a reinforcement phase 512 of PPR material. In the material 512, the reinforcement phase 512 includes fibers of the PPR material; in some examples, the reinforcement phase 512 can include particles or other configuration. In some examples, NPR-PPR composite materials can have a matrix phase of a PPR material with a reinforcement phase of an NPR material.

Figure 6:
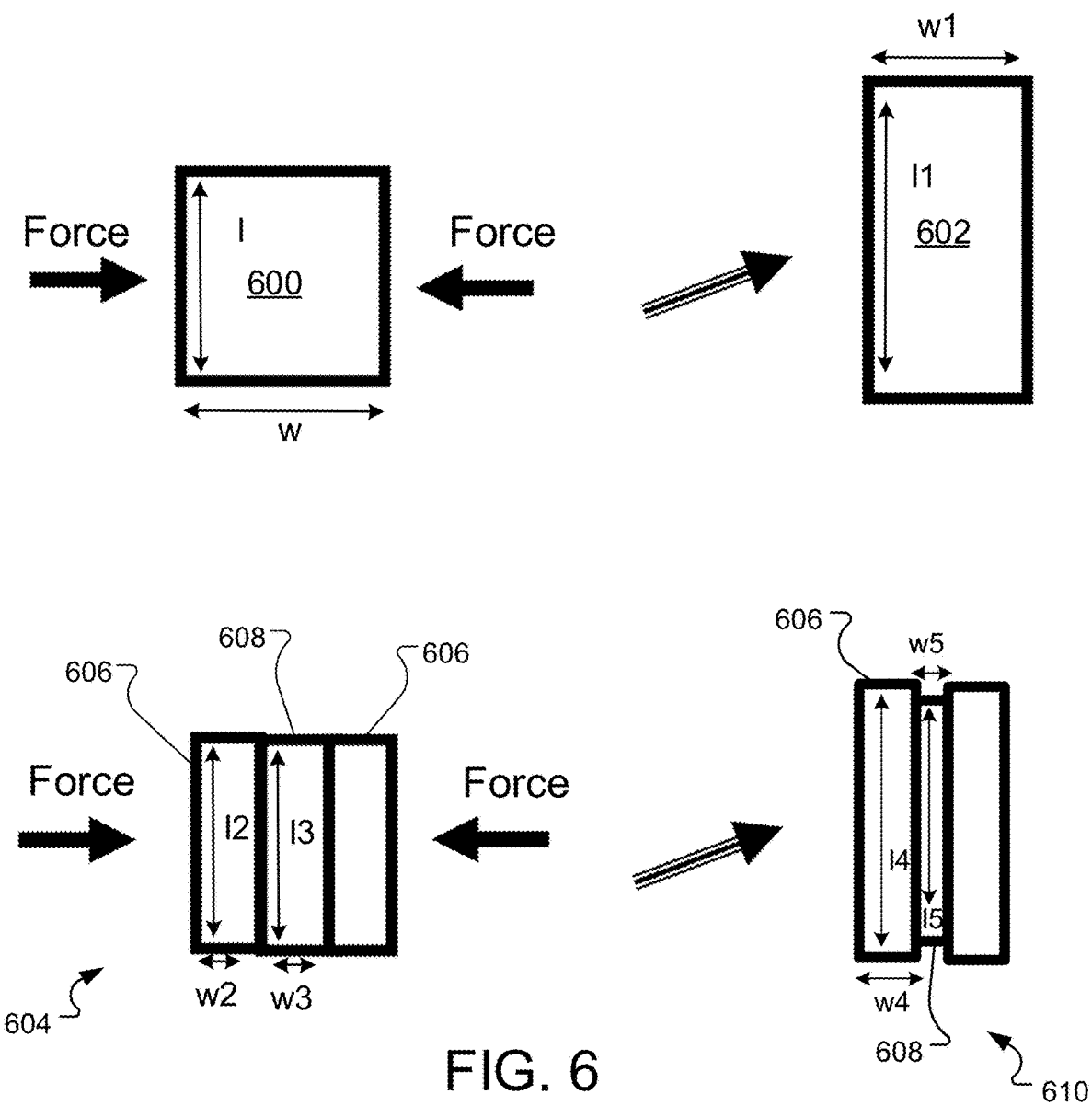
FIG. 6 is an illustration of a material with a positive Poisson's ratio and a composite material.

FIG. 6 illustrates the mechanical behavior of PPR and NPR/PPR composite materials. A hypothetical block 600 of PPR material, when compressed along its width w, deforms into a shape 602. The width w1 of the compressed block 602 is less than the width w of the uncompressed block 600, and the length l1 of the compressed block 602 is greater than the length l of the uncompressed block: the material compresses along the axis to which the compressive force is applied and expands along a perpendicular axis.

A block 604 of NPR/PPR composite material includes a region 608 of NPR material sandwiched between two regions 606 of PPR material. When the block 604 of composite material is compressed along its width, the material deforms into a shape 610. The PPR regions 606 compress along the axis of compression and expand along a perpendicular axis, e.g., as described above for the block 600 of PPR material, such that, e.g., the width w2 of a region 606 of uncompressed PPR material compresses to a smaller width w4 and the length l2 of the region 606 expands to a greater length l4. In contrast, the NPR region 608 compresses along both the axis of compression and along the perpendicular axis, such that, e.g., both the width w3 and length l3 of the uncompressed NPR region 608 are greater than the width w5 and length l5 of the compressed NPR region 608.

Figure 7A:
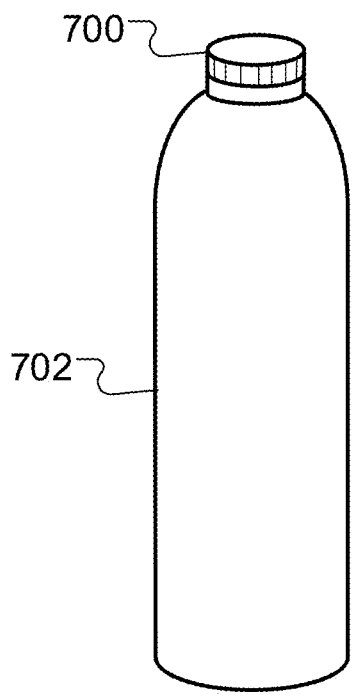
FIGS. 7A-C are illustrations of a bottle and bottle cap.
Figure 7B:
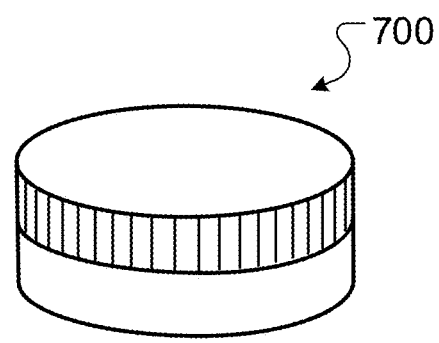
Figure 7C:
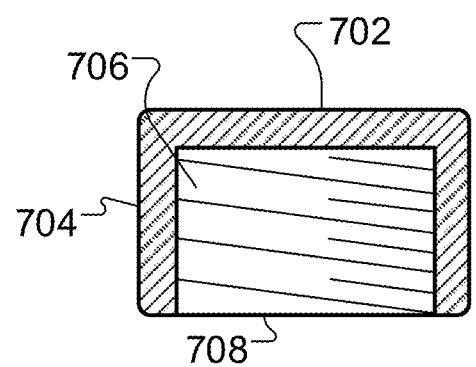

Referring to FIGS. 7A-7C, a bottle cap 700 that includes an NPR material is attached to and seals a bottle 710. FIG. 7B is a perspective view of the bottle cap 700, and FIG. 7C is a cross-sectional view of the bottle cap 700. The bottle cap 700 includes a base 702 and walls 704 connected to the base 702 to define an interior space 706 of the bottle cap. In the example of FIGS. 7A-7C, an interior surface of the walls 704 of the bottle cap 700 includes threaded features 708 that match threaded features of the bottle 702 so that the bottle cap 700 can be screwed onto an end of the bottle 710.

The bottle cap 700 includes an NPR material, such as an NPR foam material, e.g., an NPR polymer foam, NPR metal foam, or NPR ceramic foam. For instance, one or more of the base 702, the walls 704, or the threaded features 708 of the bottle cap can include an NPR material, e.g., can be formed of an NPR material or an NPR-PPR composite material. In some examples, some parts of the bottle cap 700 include an NPR material and some parts of the bottle cap 700 include only a PPR material.

NPR materials for bottle caps can be foams, such as polymeric foams, ceramic foams, metal foams, or combinations thereof.

Figure 7D:
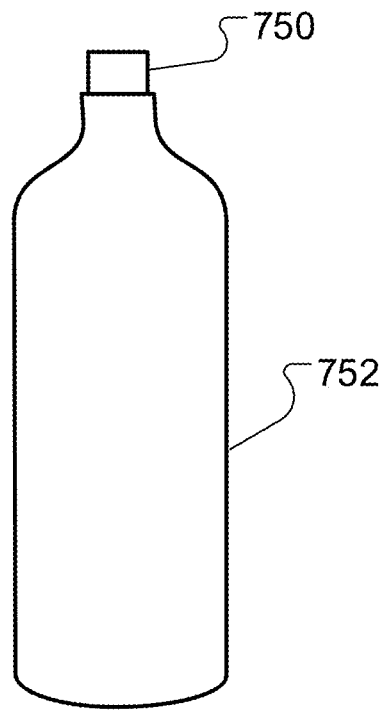
FIG. 7D is an illustration of a bottle.
Figure 7E:
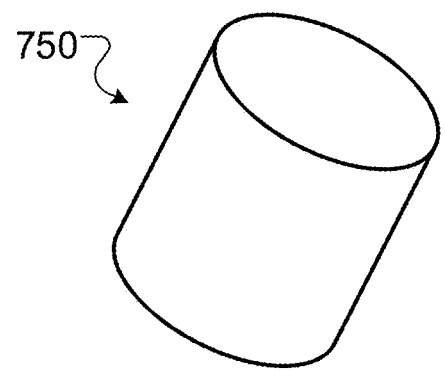
FIG. 7E is an illustration of a cork.

FIGS. 7D and 7E illustrate a bottle cork 750 including an NPR material. The bottle cork 750 can fit inside a hole in a bottle 752 to seal the bottle 752. For example, the bottle cork 750 can have a generally cylindrical shape which can fit into an elongated, cylindrical hole, such as the neck of a wine bottle.

The cork 750 can be formed of an NPR material or an NPR-PPR composite material, or can have portions formed of NPR material or NPR-PPR composite material and portions formed of PPR material. For instance, the cork 750 can include, e.g., rubber, butadiene, polybutadiene, in the form of an NPR material, a PPR material, or both. The presence of NPR material in the cork 750 can contribute to target performance characteristics, such as its ability to remain in place sealing the bottle 725. For example, the presence of NPR material in the cork 750 means that the cork will expand in a radial direction when stretched along its axis, thus firmly securing the cork 750 in the neck of the bottle 725.

Figure 8A:
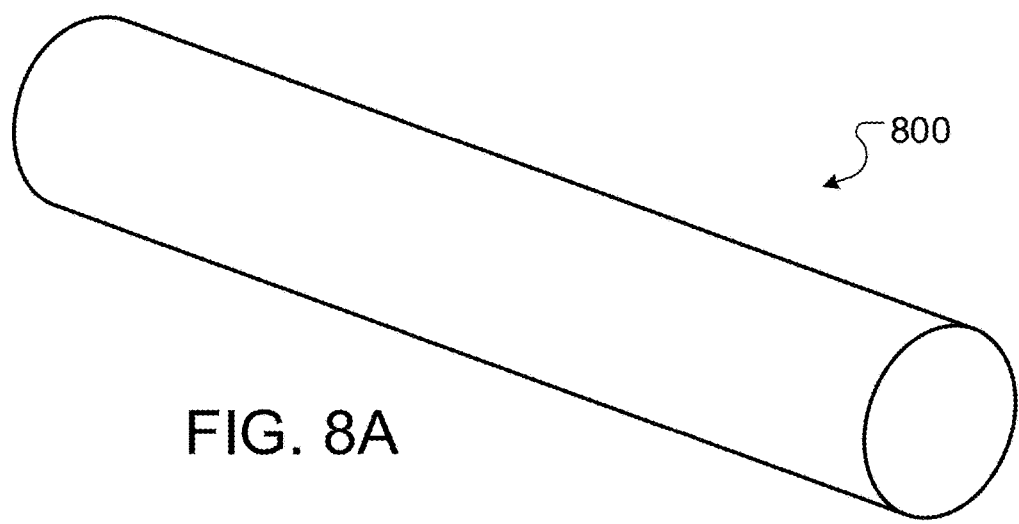
FIG. 8A is an illustration of a rivet.
Figure 8B:
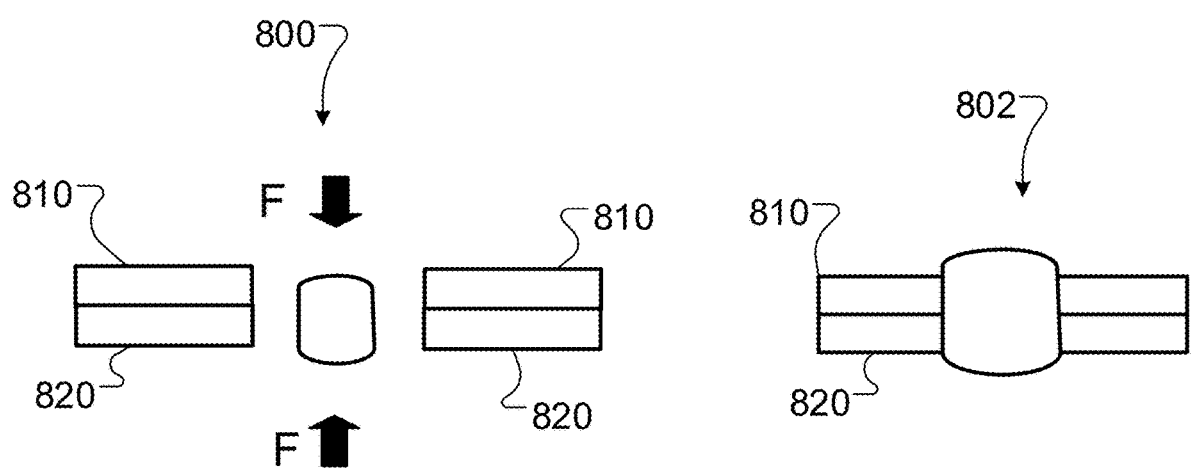
FIG. 8B is an illustration of a method of using a rivet.

FIGS. 8A and 8B illustrate a rivet 800 including an NPR material. Rivets can be used to fasten together pieces of material, e.g., metal pieces, pieces of strengthened glass, pieces of ceramic, or other materials. The rivet 800 is a smooth cylindrical shaft composed of an NPR material. In some embodiments, the shaft 802 can be rough instead of smooth. The shaft 802 can be shapes other than cylindrical (e.g., rectangular, hexagonal, octagonal, or other suitable shapes). The shaft compresses in all directions when compressed with a force, as illustrated in FIG. 8B.

As illustrated in FIG. 8B, when the rivet 800 is inserted into two (or more) pieces of material (e.g., metal pieces) 810, 820, the rivet deforms. A force F is compressing the rivet, and because the rivet is composed of an NPR material, the rivet compresses in all directions. The rivet can then be inserted into the pieces of material 810, 820. After the rivet 800 is inserted, the compression force F is removed. The rivet 800 then decompresses and expands in all directions, as illustrated by decompressed rivet 802. In the decompressed rivet 802, the shaft extends through both pieces of material 810, 820 to secure the pieces of material together. The rivet 802 securely fastens the pieces of material 810, 820 together because any tension applied to pull the pieces apart would cause the rivet 802 to expand in all directions (i.e., expand in the fashion of an NPR material), increasing the strength of the rivet. In some embodiments, the rivet includes gripping features along the exterior of the shaft to provide additional gripping strength on the pieces of material.

The rivet 800 includes an NPR material, such as an NPR foam material, e.g., an NPR polymer foam, NPR metal foam, or NPR ceramic foam. For instance, the shaft 802 can include an NPR material, e.g., can be formed of an NPR material or an NPR-PPR composite material. In some examples, some parts of the rivet 800 include an NPR material and some parts of the rivet 800 include only a PPR material. In some examples, the rivet 800 includes a metal, e.g., iron, aluminum, titanium, or another suitable metal or alloy (e.g., steel), in the form of an NPR material, a PPR material, or both. In some examples, the rivet 800 can include polymers, ceramics, or composites of metals, polymers, and/or ceramics.

In some examples, a core of the shaft 802 of the rivet is formed of an NPR material or an NPR-PPR composite material, and a PPR material coats the core such that the NPR material of the core is not exposed to the environment. This configuration can provide some of the benefits of an NPR material while also achieving benefits, such as durability, water resistance, or hardness, provided by the PPR material coating. In some examples, a core of the shaft is a PPR material and the coating is an NPR material or an NPR-PPR composite material.

The presence of NPR material in the rivet 800 can contribute to target performance characteristics, such as the ability of the rivet 800 to fasten securely. For example, a rivet including an NPR material will expand radially when a force is applied to attempt to remove the rivet from the pieces of material 810, 820, thus facilitating secure fixation of the rivet.

Other fasteners, such as screws, nails, bolts, nuts, washers, anchors, tacks, or other types of fasteners, can include NPR materials, e.g., in the configurations described above for the rivet 800.

Figure 9:
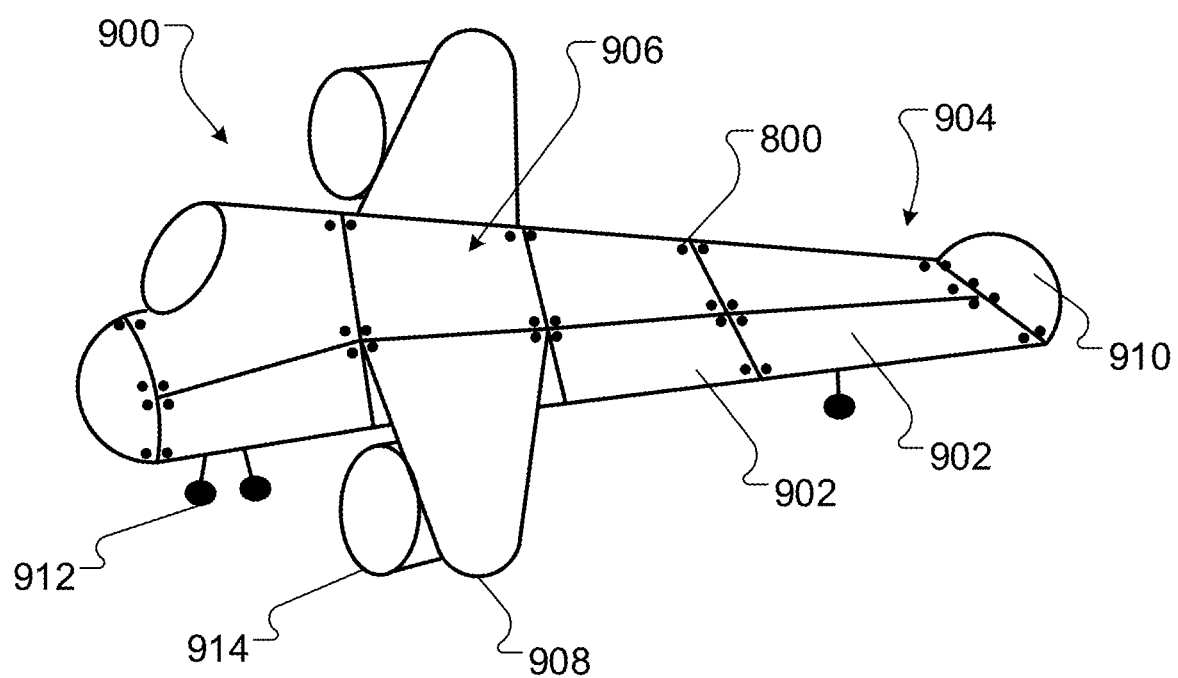
FIG. 9 is an illustration of an airplane.

The rivet 800 described above can be used to hold together a variety of materials. One example use for the rivet 800 is in holding together the panels for the skin of an airplane. FIG. 9 illustrates an airplane 900 that has panels 902 that cover exterior surface (sometimes referred to as the skin) of the airplane. Although the airplane 900 is illustrated with a tail 904, the airplane 900 can be a tailless aircraft. In some embodiments, the airplane 900 is a manned aircraft and includes one or more passengers. In some embodiments, the airplane 900 is unmanned aerial vehicle (UAV). The panels 902 are secured to each other and to the airplane 900 with rivets 800. For instance, the rivets 800 can include, e.g., steel, aluminum, titanium, or another suitable metal, in the form of an NPR material, a PPR material, or both. In an example, the steel can be ASTM 316L stainless steel. The rivets can secure materials together as described above.

Airplanes include a number of components, such as a fuselage 906, wings 908, empennage 910, undercarriage 912 and one or more engines 914. The fuselage 906 can hold crew, passengers, or cargo, depending on the use of the airplane 900. The wings 908 provide lift for the airplane 900 and allow the airplane to fly through the air. The empennage 910 provides stability to the airplane 900 during flight. Although the empennage 910 illustrated has one vertical stabilizer, 910, the empennage can include any number of stabilizers that can point vertically, horizontally, or at any angle from the tail end of the airplane. The undercarriage 912 of the aircraft can include landing gear for the aircraft to take off and to land. For example, the undercarriage 912 is illustrated as wheels, but in some embodiments can include skis to take off or land on ice or snow, floats to take off or land on water, or other landing gear. The engines 914 provide power to move the plane. For example, the engines 914 can be jet engines (e.g., turboprop engines, turbojet engines, turboshaft engines, turbofan engines, or ramjet engines). In other embodiments, the engines 914 can be propellers.

One or more parts of the airplane 900, such as the panels 902, fuselage 906, wings 908, empennage 910, etc., include an NPR material, such as an NPR foam material, e.g., an NPR an NPR metal foam; or a solid NPR material. For instance, the panels 902, wings 908, etc. can be formed of an NPR material or an NPR-PPR composite material. In some examples, the panels 902, wings 908, etc. can have portions formed of NPR material and portions formed of PPR material. In an example, the panels 902 of the airplane 900 can be formed of an NPR material, while the rest of the airplane 900 can be formed of a PPR material, e.g., aluminum or an aluminum alloy, or another suitable PPR material. In an example, the panels 902 and wings 908 can be formed of an NPR-PPR composite material and the rest of the airplane 900 can be formed of a PPR material. In some examples, fewer than all of the panels 902 of the airplane 900 include an NPR material. For instance, the panels 902 at one or both ends of the airplane 900 can include an NPR material to provide NPR characteristics at the ends of the airplane 900, while panels 902 toward the middle of the airplane can include PPR material.

When multiple plane components are formed of an NPR material, the same material is not necessarily used for all components. For instance, the panels 902 can include a first type of NPR foam material, and the empennage 910 can include a second type of NPR foam material; or some panels 902 include one type of NPR material and other panels 902 include a different type of NPR material.

The NPR foam material used for the airplane 900 can be an NPR metal foam, such as a foam of aluminum, or other metals, or alloys thereof (e.g., aluminum alloyed with copper (4.5%), manganese (0.6%), and magnesium (1.5%)). Using an aluminum alloy can be advantageous because the alloying elements will strengthen the metal while decreasing stretchability compared to pure aluminum. In some examples, components of the airplane 900 are formed of an NPR composite material that includes both an NPR material (e.g., an NPR foam material) and a PPR material.

In some examples, a core of each of one or more panels is formed of an NPR material or an NPR-PPR composite material, and a PPR material coats the core such that the NPR material of the core is not exposed to the environment. This configuration can provide some of the benefits of an NPR material while also achieving benefits, such as durability, water resistance, or hardness, provided by the PPR material coating. In some examples, the core of the panel is a PPR material and the coating is an NPR material or an NPR-PPR composite material.

The presence of NPR material in the airplane panels 902 can contribute to target performance characteristics of the airplane. For example, the panels 902 can have a lighter density, a better strength to weight ratio, a greater porosity/ surface area, and better dimensional stability than panels formed of traditional PPR materials. These characteristics can allow for a stronger skin to protect the interior of the airplane 900 and allows for a lesser amount of materials to be used when constructing the skin of the airplane 900.

Figure 10:
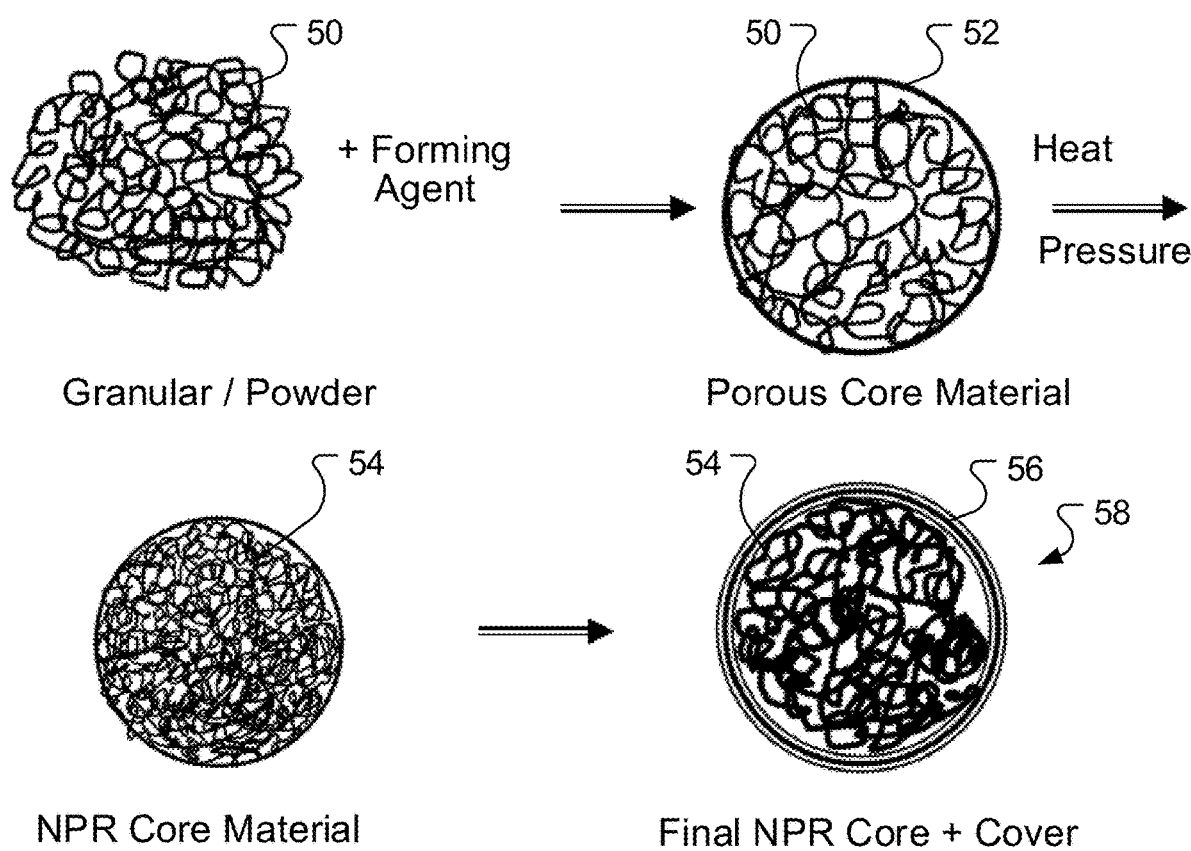
FIG. 10 is an illustration of a method of making an NPR material.

FIG. 10 illustrates an example method of making an object, such as a portion of a fastener or an airplane panel, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material, such as a fastener. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. Additive manufacturing techniques can enable seams to be eliminated.

Other embodiments are within the scope of the following claims.

What is claimed is:

1. A bottle cap comprising:
a base; and
walls connected to the base to define an interior of the bottle cap, wherein the base, the walls, or both are formed of a negative Poisson's ratio (NPR) foam material that has a Poisson's ratio of between 0 and −1.

2. The bottle cap of claim 1, wherein the NPR material comprises microspheres.

3. The bottle cap of claim 1, wherein the bottle cap has a Poisson's ratio of between 0 and −0.8.

4. The bottle cap of claim 1, wherein the NPR material is composed of a cellular structure having a characteristic dimension of between 0.1 μm and 3 mm.

5. The bottle cap of claim 1, wherein an interior surface of the walls comprises threaded features.

6. The bottle cap of claim 1, in which the NPR foam material comprises an NPR ceramic foam, an NPR metal foam, an NPR polymer foam, or an NPR-PPR composite foam.

7. A method of making a bottle cap, the method comprising:
forming a material into an negative Poisson's ratio (NPR) material, in which the NPR material has a Poisson's ratio of between 0 and −1; and
creating at least a portion of a bottle cap out of the NPR material;
wherein the bottle cap comprises a base and walls connected to the base to define an interior.

8. The method of claim 7, wherein forming the material into an NPR material comprises forming microspheres of the material.

9. A rivet comprising:
a smooth cylindrical shaft, the shaft configured to expand in diameter when deformed;
wherein the shaft comprises a negative Poisson's ratio (NPR) material, in which the NPR material has a Poisson's ratio of between 0 and −1, and in which the NPR material comprises an NPR foam.

10. The rivet of claim 9, in which the NPR foam material comprises an NPR metal foam.

11. The rivet of claim 10, in which the NPR metal foam comprises one or more of iron, titanium, or aluminum.

12. The rivet of claim 9, in which the NPR material has a Poisson's ratio of between 0 and −0.8.

13. The rivet of claim 9, in which the NPR material is composed of a cellular structure having a characteristic dimension of between 0.1 μm and 3 mm.

14. The rivet of claim 9, in which the shaft comprises a composite material comprising the NPR material and a positive Poisson's ratio (PPR) material.

* * * * *